United States Patent

Kashida et al.

[11] Patent Number: 5,132,366
[45] Date of Patent: Jul. 21, 1992

[54] CURABLE SILICONE COMPOSITION

[75] Inventors: Meguru Kashida, Annaka; Yasushi Yamamoto, Takasaki; Hiroki Konno; Hirofumi Kishita, both of Annaka, all of Japan

[73] Assignee: Shin-Etsu Chemical Co., Ltd., Tokyo, Japan

[21] Appl. No.: 470,142

[22] Filed: Jan. 25, 1990

[30] Foreign Application Priority Data

Jan. 27, 1989 [JP] Japan .................................. 1-18151

[51] Int. Cl.$^5$ ...................... C08L 27/16; C08L 27/20; C08L 83/05
[52] U.S. Cl. .................................. 525/102; 525/104; 525/478; 525/479; 525/101
[58] Field of Search ............... 525/102, 104, 100, 101, 525/478, 479; 528/42

[56] References Cited

U.S. PATENT DOCUMENTS

| | | | |
|---|---|---|---|
| 3,415,900 | 12/1968 | Robb | 525/104 |
| 3,507,844 | 4/1970 | Wood | 525/104 |
| 3,538,028 | 11/1970 | Morgan | 525/104 |
| 4,028,431 | 6/1977 | Futami et al. | 525/104 |
| 4,263,414 | 4/1981 | West | 525/102 |
| 4,549,004 | 10/1985 | von Au et al. | 528/42 |
| 4,714,734 | 12/1987 | Hashimoto et al. | 524/496 |
| 4,985,483 | 1/1991 | Saito et al. | 524/265 |
| 4,985,526 | 1/1991 | Kishita et al. | 528/15 |
| 5,010,137 | 4/1991 | Umeda et al. | 525/104 |

FOREIGN PATENT DOCUMENTS

| | | | |
|---|---|---|---|
| 56-050948 | 5/1981 | Japan | 525/102 |
| 61-004750 | 1/1986 | Japan | 525/104 |

*Primary Examiner*—John C. Bleutge
*Assistant Examiner*—Ralph H. Dean, Jr.
*Attorney, Agent, or Firm*—Oblon, Spivak, McClelland, Maier & Neustadt

[57] ABSTRACT

The curable silicone composition of this invention contains as essential components, (A) a copolymer comprised of vinylidene fluoride and/or tetrafluoroethylene component(s), (B) an organopolysiloxane having in its molecule aliphatic unsaturated groups and a fluorine-containing substituent, (C) an organohydrogenpolysiloxane, and (D) a catalyst for addition reaction. This composition can be effectively used as a release agent.

10 Claims, No Drawings

CURABLE SILICONE COMPOSITION

BACKGROUND OF THE INVENTION

1. Field of the Invention

This invention relates to a curable silicone composition. More particularly, it relates to a curable silicone composition useful as a release agent.

2. Description of the Prior Art

Silicone pressure-sensitive adhesives have good thermal resistance, cold resistance, chemical resistance and electrical insulating properties, and hence are used for extensive purposes.

As release agents used for release papers for protecting the adhesive surfaces of the silicone pressure-sensitive adhesives, it is known to use those mainly composed of a copolymer of a polyfluoroalkylvinyl monomer and a silicone monomer containing a vinyl group and a hydrolyzable group. Japanese Pre-examination Patent Publication (KOKAI) No. 228078/1986 discloses a method in which such a copolymer is cured to form a release layer.

The release layer obtained by the above method has release properties of practical utility to the silicone pressure-sensitive adhesives. Since, however, the copolymer has a low viscosity before cured, the copolymer has insufficient wettability for substrates such as papers, laminated papers and films and therefore is liable to be repelled when applied on the substrates. As a result, no satisfactory release layer can be formed on the part at which the copolymer has been repelled, thus causing various troubles. In the case of a substrate insufficiently sealed up such as glassine paper, the copolymer penetrates seriously through it, so that it is difficult to obtain a release paper with stable release properties. In particular, when the release agent diluted with a solvent is used, the above repellency or penetration is more seriously occur, bringing about a great problem from a practical viewpoint.

SUMMARY OF THE INVENTION

Accordingly, an object of this invention is to provide a curable silicone composition suitable as a release agent used for silicone pressure-sensitive adhesives, that has good wettability for substrates, and yet can give good release properties to the substrates and can bring about good residual adhesion properties of an adhesive.

This invention provides a curable silicone composition comprising:

(A) a copolymer comprised of at least one compound of vinylidene fluoride and tetrafluoroethylene, and at least one kind of fluorine-containing monomer of a different type, having an ethylenically unsaturated bond;

(B) an organopolysiloxane having in its molecule at least two silicon-bonded aliphatic unsaturated groups, and also having in its molecule at least one silicon-bonded fluorine-containing substituent;

(C) an organohydrogenpolysiloxane having in its molecule at least two silicon-bonded hydrogen atoms; and (D) a catalyst for addition reaction.

The curable silicone composition of this invention is suitable as a release agent used for silicone pressure-sensitive adhesives, and has the following advantages over the prior art release agents.

1) Because of good wettability for substrates, the resulting cured coating can be uniform and smooth, and hence has good release properties to silicone pressure-sensitive adhesives. Moreover, the silicone pressure-sensitive adhesives for which this cured coating is used as the release layer have good residual adhesion properties.

2) The composition penetrates with difficulty through a substrate through which fluids generally penetrate readily, such as glassine paper, even when the composition is coated as a solution in a solvent. Therefore, the resulting cured coating has stable release properties.

DETAILED DESCRIPTION OF THE INVENTION

Component (A)

In the curable silicone composition of this invention, the copolymer used as component (A) is comprised of vinylidene fluoride and/or tetrafluoroethylene, and at least one kind of fluorine-containing monomer having an ethylenically unsaturated bond and differing from both of said vinylidene fluoride and tetrafluoroethylen.

The fluorine-containing ethylenically unsaturated monomer includes, for example, hexafluoropropene, pentafluoropropene, trifluoroethylene, trifluorochloroethylene, vinyl fluoride, perfluoro(methyl vinyl ether), perfluoro(ethyl vinyl ether), perfluoro(propyl vinyl ether), 2-iodoperfluoropropene, and bromotrifluoroethylene. Of these, copolymers particularly preferred from the viewpoint of raw-material availability or cost are a vinylidene fluoride/hexafluoropropene bipolymer, a tetrafluoroethylene/hexafluoropropene bipolymer, and a vinylidene fluoride/tetrafluoroethylene/hexafluoropropene terpolymer.

In the copolymer, the vinylidene fluoride and/or tetrafluoroethylene component(s) may preferably comprise from 15 to 85% by weight.

This component (A) has the action of suppressing the penetration of the composition through the substrate.

Component (B)

In the component (B) organopolysiloxane used in the curable silicone composition of this invention, the silicon-bonded aliphatic unsaturated group includes, for example, alkenyl groups having 2 to 10 carbon atoms. From the viewpoint of practical use, a vinyl group or an allyl group is preferred. This aliphatic unsaturated group is required to be present in the molecule in the number of at least two, and preferably of from 3 to 30, per 1,000 silicon atoms in the molecule.

From the viewpoints of production cost and performance, the silicon-bonded fluorine-containing substituent includes, for example, the substituents represented by the following formulas:

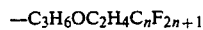

$-C_3H_6OC_2H_4C_nF_{2n+1}$ wherein n is an integer of 3 to 10;

$-C_3H_6OCH_2C_nF_{2n+1}$ wherein n is an integer of 3 to 10;

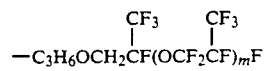

$$-C_3H_6OCH_2\underset{\underset{CF_3}{|}}{C}F(OCF_2\underset{\underset{CF_3}{|}}{C}F)_mF$$

wherein m is an integer of 1 to 5; and

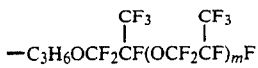

$$-C_3H_6OCF_2CF(OCF_2CF)_mF$$

wherein m is an integer of 1 to 5.

This fluorine-containing substituent is required to be present in the component (B) organopolysiloxane in the number of at least one, and, on account of the compatibility with the component (A) or the release properties to the silicone pressure-sensitive adhesives, may preferably be contained in an amount of not less than 3 mol % based on the whole silicon-bonded organic groups.

Other silicon-bonded organic groups possessed by the component (B) include, for example, hydrocarbon groups as exemplified by an alkyl group such as a methyl group, an ethyl group, a propyl group or a butyl group, and an aryl group such as a phenyl group. These may be used singly or in combination of two or more. From the viewpoints of the production cost and the release performance to be attained, however, the methyl group may preferably be used singly. This organopolysiloxane may be linear or branched, but may preferably be linear. On account of the reactivity, it should have a viscosity of not less than 30 cP, and particularly preferably from 1,000 to 10,000,000 cP, at 25° C.

This component (B) organopolysiloxane can be readily prepared by, for example, mixing an organocyclotrisiloxane having a fluorine-containing substituent, an organocyclotrisiloxane having a vinyl group, an organocyclotrisiloxane having other required organic groups, and a linear organopolysiloxane serving as a terminator in appropriate amounts according to the purpose, and polymerizing them by a known equilibration reaction in the presence of an acid or alkali catalyst.

The component (B) organopolysiloxane may be mixed in an amount of from 5 to 2,000 parts by weight, and preferably from 20 to 500 parts by weight, per 100 parts by weight of the component (A). The component (B) in an amount less than 5 parts by weight may result in too low a curing rate for practical use. On the other hand, the component (B) in an amount more than 2,000 parts by weight may impair the effect attributable to the component (A), thus causing a lowering of wettability and an increase in repellency.

Component (C)

The component (C) organohydrogenpolysiloxane used in the curable silicone composition of this invention has in its molecule at least two, and preferably not less than three, silicon-bonded hydrogen atoms, and, on account of the reactivity, it is advantageous for them to be contained in an amount of not less than 20 mol % of the whole silicon-bonded pendant hydrogen atoms and organic groups.

In this organohydrogenpolysiloxane, the silicon-bonded organic groups, other than the hydrogen atoms, include the same fluorine-containing substituents and hydrocarbon groups as those exemplified in relation to the component (B). In particular, presence of not less than 3 mol % of the fluorine-containing substituents, based on the whole pendant groups, can bring about an improvement in the compatibility with the components (A) and (B), and hence is advantageous in view of the reaction. This organohydrogenpolysiloxane may have any form of linear, branched and cyclic forms, and, on account of the reactivity, should have a viscosity of not less than 10 cP at 25° C. This organohydrogenpolysiloxane can be similarly prepared by, for example, the method using the equilibration reaction as described above in relation to the component (B) organopolysiloxane.

The component (C) is mixed in an amount such that the silicon-bonded hydrogen atoms in the component (C) ranges from 0.3 to 30 in number, and preferably from 1.0 to 5.0 in number, per one silicon-bonded unsaturated group in the component (B) organopolysiloxane. If the amount of the silicon-bonded hydrogen atoms in the component (C) is less than 0.3 in number, the curing rate of the resulting composition is too low from viewpoint of practical use. On the other hand, if the amount thereof in the component (C) is more than 30 in number, the residual adhesion properties of pressure-sensitive which contacts the cured composition is liable to be lowered, because of an increase in the component (C) after curing, which does not participate in the addition reaction.

Component (D)

The component (D) addition reaction catalyst is used to cause addition reaction between the component (B) and component (C). The reaction catalyst of this type includes catalysts known in the art, for example, metals such as platinum, rhodium and iridium, and compounds thereof. Preferred catalysts are platinum catalysts, for example, chloroplatinic acid, complex salts of chloroplatinic acid with various sorts of olefin or vinylsiloxane, platinum black, and those comprising platinum supported on any sort of carrier.

The amount of the component (D) may be in the range of from 1 to 10,000 ppm, and preferably from 50 to 1,000 ppm, in terms of platinum content, based on the total weight of the components (B) and (C).

Other Additives

In the curable silicone composition of this invention, various additives may be optionally added in addition to the essential components (A) to (D).

For example, activity restrainers such as organic nitrogen compounds, organic phosphorus compounds, acetylene compounds, oxime compounds and organic chlorine compounds, of various types, may be added for the purpose of suppressing the activity of (D) catalyst and elongating the working life of the composition.

For the purpose of making film formation easier when coating of the composition, the curable silicone composition of this invention may also be diluted with an organic solvent capable of dissolving the components (A) to (D), such as methaxylene fluoride or methyl ethyl ketone.

It is also possible to add fillers such as silica, talc, clay, diatomaceous earth, and carbon black, as well as reinforcing agents, plasticizers, colorants, lubricants, adhesion improvers, and so forth. However, compounds acting as catalyst poisons against the addition reaction between the components (B) and (C) should be avoided.

In the curable silicone composition of this invention, the component (A) copolymer need not to be vulcanized. Hence, it is not essential to use components such as vulcanizing agents, e.g., organic peroxides, polyamines and polyols, and acid-acceptors, e.g., metal oxides and metal hydroxides. However, these components may be optionally added to the composition.

Uses

The curable silicone composition comprising the components as described above is useful as the release agent, and used, for example, as a release layer formed on substrates of release paper and the like for protecting the adhesive surfaces of silicone pressure-sensitive adhesives.

In the instance where the release layer is formed on the surface of a substrate with the curable silicone composition of this invention, the substrate may include, for example, substrates not sealed up, such as glassine paper and wood-free paper; polyethylene-laminated paper, polyester film, polypropylene film, polyimide film, and polyethylene film without any particular limitations.

The curable silicone composition of this invention can be coated on the substrate by known techniques such as roll coating, spray coating, and dip coating. After coated on the substrate, the curable silicone composition of this invention can be cured by known techniques such as room temperature curing, heat curing, and ultraviolet curing. It may preferably be heat-cured at a temperature of from 100° C. to 200° C. and for 10 seconds to 60 seconds.

EXAMPLES

This invention will now be described below in more detail by way of Examples.

EXAMPLES 1 to 16

The following were used as the components of compositions.

Component (A): Two types of elastic copolymers represented by F-1 and F-2 shown in Table 1.

Component (B): Four types of organopolysiloxanes having vinyl groups, represented by V-1, V-2, V-3 and V-4 in Table 1.

Component (C): Three types of organohydrogenpolysiloxanes represented by H-1, H-2 and H-3 in Table 1.

Component (D): A complex of chloroplatinic acid with vinylsiloxane, having a platinum concentration of 2.0% (called C-1).

As other component, methaxylene hexafluoride was used as a diluting solvent.

These materials were mixed in the amounts as shown in Table 2. Curable compositions of Examples 1 to 16 were thus prepared.

Compositions not having at least one of the components (A) to (D) were also prepared as Comparative Examples.

TABLE 1

Component (A):

F-1: Vinylidene fluoride/hexafluoropropene copolymer (intrinsic viscosity measured in 35° C. methyl ethyl ketone: 0.95)

F-2 Vinylidene fluoride/tetrafluoroethylene/hexafluoropropene copolymer (intrinsic viscosity measured in 35° C. methyl ethyl ketone: 0.93)

Component (B):

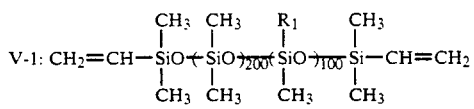

wherein $R_1$ is $-C_3H_6OCH_2CFOCF_2CFOC_3F_7$ with $CF_3$ groups

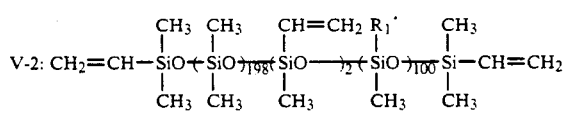

wherein $R_1$ is $-C_3H_6OCH_2CFOCF_2CFOC_3F_7$ with $CF_3$ groups

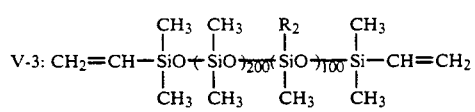

wherein $R_2$ is $-C_3H_6OCF_2CFOCF_2CFOC_3F_7$ with $CF_3$ groups

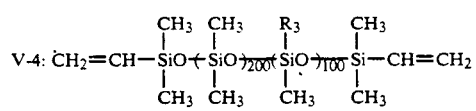

wherein $R_3$ is $-C_3H_6OCH_2CH_2C_8F_{17}$

Component (C):

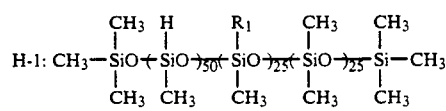

wherein $R_1$ is $-C_3H_6OCH_2CFOCF_2CFOC_3F_7$ with $CF_3$ groups

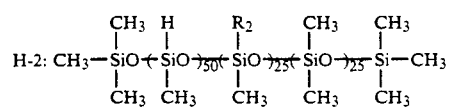

wherein $R_2$ is $-C_3H_6OCF_2CFOCF_2CFOC_3F_7$ with $CF_3$ groups

TABLE 1-continued $$\text{H-3: } CH_3-\underset{\underset{CH_3}{|}}{\overset{\overset{CH_3}{|}}{Si}}O\left(\underset{\underset{CH_3}{|}}{\overset{\overset{H}{|}}{Si}}O\right)_{8}\underset{\underset{CH_3}{|}}{\overset{\overset{CH_3}{|}}{Si}}-CH_3$$

TABLE 2

| | Mixing formulation (parts by weight) | | | | | | | | | | |
|---|---|---|---|---|---|---|---|---|---|---|---|
| | Component (A) | | Component (B) | | | | Component (C) | | | Component (D) | Methaxylene | SiH/ |
| | F-1 | F-2 | V-1 | V-2 | V-3 | V-4 | H-1 | H-2 | H-3 | C-1 | hexafluoride | SiCH=CH$_2$ |
| Example: | | | | | | | | | | | | |
| 1 | 100 | — | 50 | — | — | — | 1.0 | — | — | 0.5 | 2,850 | 1.9 |
| 2 | 100 | — | 100 | — | — | — | 2.0 | — | — | 1.0 | 3,800 | 1.9 |
| 3 | 100 | — | 100 | — | — | — | 1.0 | — | — | 1.0 | 3,800 | 0.95 |
| 4 | 100 | — | 100 | — | — | — | 4.0 | — | — | 1.0 | 3,800 | 3.8 |
| 5 | 100 | — | 100 | — | — | — | — | 2.0 | — | 1.0 | 3,800 | 1.8 |
| 6 | 100 | — | 100 | — | — | — | — | — | 0.42 | 1.0 | 3,800 | 1.9 |
| 7 | 100 | — | 300 | — | — | — | 6.0 | — | — | 1.0 | 7,600 | 1.9 |
| 8 | 100 | — | — | 100 | — | — | 4.0 | — | — | 1.0 | 3,800 | 1.9 |
| 9 | 100 | — | — | — | 100 | — | 2.0 | — | — | 1.0 | 3,800 | 2.0 |
| 10 | 100 | — | — | — | — | 100 | 2.0 | — | — | 1.0 | 3,800 | 1.8 |
| 11 | — | 100 | 100 | — | — | — | 2.0 | — | — | 1.0 | 3,800 | 1.9 |
| 12 | — | 100 | — | 100 | — | — | 4.0 | — | — | 1.0 | 3,800 | 1.9 |
| 13 | — | 100 | — | — | 100 | — | 2.0 | — | — | 1.0 | 3,800 | 2.0 |
| 14 | — | 100 | — | — | — | 100 | 2.0 | — | — | 1.0 | 3,800 | 1.8 |
| 15 | — | 100 | 100 | — | — | — | — | 2.0 | — | 1.0 | 3,800 | 1.8 |
| 16 | — | 100 | 100 | — | — | — | — | — | 0.42 | 1.0 | 3,800 | 1.9 |
| Comparative Example: | | | | | | | | | | | | |
| 1 | 100 | — | — | — | — | — | — | — | — | — | 1900 | — |
| 2 | — | 100 | — | — | — | — | 2.0 | — | — | 1.0 | 1900 | 1.9 |

The following properties of the compositions obtained in the above were evaluated as follows.

(1) Wettability:

The composition was coated on a polyester film 38 microns thick, with a wire bar No. 5, and the occurrence of repellency on the coated surface was observed.

(2) Pentration property:

The composition was coated on 50 g/m$^2$ glassine paper, not sealed up, with a wire bar No. 18, and how the solution penetrates through the substrate to its back side was observed.

(3) Release properties:

The composition was coated on 50 g/m$^2$ glassine paper, not sealed up, with a wire bar No. 14. In a circulating hot-air drier, heating was carried out at 160° C. for 60 seconds to form a cured coating.

The paper thus coated and a polyester film 38 micron thick provided with a silicone pressure-sensitive adhesive (KR-120; a product of Shin-Etsu Chemical Co., Ltd.) with a thickness of 20 microns were laminated in the manner that the cured coating surface of the former and the pressure-sensitive surface of the latter may be face-to-face, and then contact-bonded under a load of 20 g/cm$^2$ at 70° C. for 20 hours.

Next, using a tensile tester, the pressure-sensitive surface was peeled at an angle of 180° and a rate of 0.3 m/min. The force (g) required for the peeling was measured.

(4) Residual adhesion properties:

The pressure-sensitive surface peeled from the cured coating surface by the above method (3) was stuck on an aluminum sheet, followed by contact bonding with a rubber roll of 2 kg in weight. After 2 hours, the pressure-sensitive surface was peeled at an angle of 180° and a rate of 0.3 m/min. The force (g) required for the peeling was measured.

Results of evaluation on the respective properties are shown in Table 3.

TABLE 3

| | Wettability | Penetration property | Peel force (g/25 mm) | Residual adhesion property (g/25 mm) |
|---|---|---|---|---|
| Example: | | | | |
| 1 | Good, no repellency | Little penetration | 52 | 735 |
| 2 | Good, no repellency | Little penetration | 31 | 750 |
| 3 | Good, no repellency | Little penetration | 36 | 760 |
| 4 | Good, no repellency | Little penetration | 30 | 755 |
| 5 | Good, no repellency | Little penetration | 42 | 750 |
| 6 | Good, no repellency | Little penetration | 44 | 750 |
| 7 | Good, no repellency | Little penetration | 65 | 770 |
| 8 | Good, no repellency | Little penetration | 40 | 730 |
| 9 | Good, no repellency | Little penetration | 44 | 755 |
| 10 | Good, no repellency | Little penetration | 42 | 750 |
| 11 | Good, no repellency | Little penetration | 43 | 750 |
| 12 | Good, no repellency | Little penetration | 37 | 755 |
| 13 | Good, no repellency | Little penetration | 36 | 740 |
| 14 | Good, no repellency | Little penetration | 41 | 755 |
| 15 | Good, no repellency | Little penetration | 45 | 740 |
| 16 | Good, no repellency | Little penetration | 45 | 755 |
| Comparative Example: | | | | |
| 1 | Tackiness | Little | 22 | 430 |

TABLE 3-continued

| Wettability | Penetration property | Peel force (g/25 mm) | Residual adhesion property (g/25 mm) |
|---|---|---|---|
| on the surface | penetration | | |
| 2 Repellency greatly occurred | Penetration seriously occurred | 117 | 760 |

We claim:

1. A curable silicone composition comprising:
   (A) a copolymer comprised of at least one compound of vinylidene fluoride, tetrafluoroethylene, or of both vinylidene fluoride and tetrafluoroethylene and at least one other ethylenically unsaturated monomer containing fluorine;
   (B) an organopolysiloxane having in its molecule at least two silicon-bonded aliphatic unsaturated groups, and also having in its molecule at least one silicon-bonded fluorine-containing substituent;
   (C) an organohydrogenpolysiloxane having in its molecule at least two silicon-bonded hydrogen atoms; and
   (D) a catalyst for the addition reaction between component B and component C.

2. The composition of claim 1, wherein said component (B) is present in an amount of from 5 to 2,000 parts by weight per 100 parts by weight of said component (A).

3. The composition of claim 1, wherein said component (C) is present in an amount such that the silicon-bonded hydrogen atoms in the component (C) ranges from 0.3 to 30 in number, per one silicon-bonded unsaturated group in the component (B).

4. The composition of claim 1, wherein the vinylidene fluoride, tetrafluoroethylene or the total of vinylidene fluoride and tetrafluoroethylene comprises 15 to 85% by weight of said copolymer of the component (A).

5. The composition of claim 1, wherein said component (A) copolymer is at least one member selected from the group consisting of a vinylidene fluoride/hexafluoro-propene bipolymer, a tetrafluoroethylene/hexafluoropropene bipolymer, and a vinylidene fluoride/tetrafluoroethylene/hexafluoropropene terpolymer.

6. The composition of claim 1, wherein said component (B) organopolysiloxane has an alkenyl group having 2 to 10 carbon atoms, as the silicon-bonded aliphatic unsaturated group.

7. The composition of claim 6, wherein said alkenyl group is a vinyl group or an allyl group.

8. The composition of claim 1, wherein said component (B) organopolysiloxane has an organic group selected from the group consisting of one or more of the following formulas:

$$-C_3H_6OC_2H_4C_nF_{2n+1}$$

where n is an integer of 3 to 10;

$$-C_3H_6OCH_2H_4C_nF_{2n+1}$$

wherein n is an integer of 3 to 10;

$$-C_3H_6OCH_2CF(OCF_2CF)_mF$$
$$\quad\quad\quad\quad\;\;|\quad\quad\;\;|$$
$$\quad\quad\quad\quad CF_3\quad CF_3$$

wherein m is an integer of 1 to 5; and $$-C_3H_6OCF_2CF(OCF_2CF)_mF$$
$$\quad\quad\quad\quad\;\;|\quad\quad\;\;|$$
$$\quad\quad\quad\quad CF_3\quad CF_3$$

wherein m is an integer of 1 to 5; as the silicon-bonded fluorine-containing substituent.

9. A cured silicone composition prepared by curing a silicon composition comprising:
   (A) a copolymer comprised of at least one of vinylidene fluoride, tetrafluoroethylene, or of both vinylidene fluoride and tetrafluoroethylene, and at least one other ethylenically unsaturated monomer containing fluorine;
   (B) an organopolysiloxane having in its molecule at least two aliphatic unsaturated groups bonded to silicon atoms, and also having in its molecule at least one fluorine-containing substituent bonded to silicon atoms;
   (C) an organohydrogenpolysiloxane having in its molecule at least two hydrogen atoms bonded to silicon atoms; and
   (D) a catalyst for the addition reaction between component B and component C.

10. A process for the preparation of a composition as claimed in claim 1, said process comprising admixing the components (A), (B), (C) and (D) as defined in claim 1.

* * * * *